US012385870B2

(12) United States Patent
Muraoka et al.

(10) Patent No.: US 12,385,870 B2
(45) Date of Patent: Aug. 12, 2025

(54) JOINT PORTION EVALUATING METHOD AND JOINT PORTION EVALUATING DEVICE

(71) Applicants: MITSUBISHI HEAVY INDUSTRIES, LTD., Tokyo (JP); Akita University, Akita (JP)

(72) Inventors: Mikio Muraoka, Akita (JP); Nobuyuki Kamihara, Tokyo (JP); Kiyoka Takagi, Tokyo (JP); Sota Kamo, Tokyo (JP); Naomoto Ishikawa, Tokyo (JP); Hideki Horizono, Tokyo (JP); Toshiyuki Takayanagi, Tokyo (JP)

(73) Assignees: MITSUBISHI HEAVY INDUSTRIES, LTD., Tokyo (JP); AKITA UNIVERSITY, Akita (JP)

( * ) Notice: Subject to any disclaimer, the term of this patent is extended or adjusted under 35 U.S.C. 154(b) by 107 days.

(21) Appl. No.: 18/275,906

(22) PCT Filed: Feb. 9, 2022

(86) PCT No.: PCT/JP2022/005150
§ 371 (c)(1),
(2) Date: Aug. 4, 2023

(87) PCT Pub. No.: WO2022/172961
PCT Pub. Date: Aug. 18, 2022

(65) Prior Publication Data
US 2024/0118234 A1    Apr. 11, 2024

(30) Foreign Application Priority Data
Feb. 12, 2021    (JP) .................................. 2021-020761

(51) Int. Cl.
*G01N 27/24*    (2006.01)

(52) U.S. Cl.
CPC .................................... *G01N 27/24* (2013.01)

(58) Field of Classification Search
CPC ................................ G01N 27/24; G01N 27/22
See application file for complete search history.

(56) References Cited

U.S. PATENT DOCUMENTS

| 5,245,293 | A | * | 9/1993 | Runner | ................ | G01N 33/442 |
| | | | | | | 324/693 |
| 7,917,311 | B2 | * | 3/2011 | Finkel | .................... | G01N 29/07 |
| | | | | | | 702/39 |
| 10,578,576 | B2 | * | 3/2020 | Kamihara | ............ | G01N 27/205 |

FOREIGN PATENT DOCUMENTS

| CN | 110202859 A | * | 9/2019 | ........... | B23K 26/362 |
| JP | 2000-131256 | | 5/2000 | | |

(Continued)

OTHER PUBLICATIONS

International Search Report issued Apr. 19, 2022 in corresponding International (PCT) Patent Application No. PCT/JP2022/005150, with English language translation.

(Continued)

*Primary Examiner* — Feba Pothen
(74) *Attorney, Agent, or Firm* — Wenderoth, Lind & Ponack, L.L.P.

(57) ABSTRACT

A joint portion evaluating method for measuring and evaluating a joint state of a joint portion at which a first joint body and a second joint body are joined together, the joint portion evaluating method including the steps of: acquiring as a reference value a capacitance value of the joint portion in a reference measurement state serving as a reference for measurement conditions; changing a measurement state from the reference measurement state and acquiring as a measured value a capacitance value of the joint portion in a changed measurement state arising after the change of the measurement state; deriving as a measurement evaluation (Continued)

value a value obtained by referencing the measured value with the reference value; and performing an evaluation based on the derived measurement evaluation value.

15 Claims, 2 Drawing Sheets

(56) References Cited

FOREIGN PATENT DOCUMENTS

| | | | | |
|---|---|---|---|---|
| JP | 2001-74586 | | 3/2001 | |
| JP | 2001108662 A | * | 4/2001 | ........... B29C 65/342 |
| JP | 2004-361120 | | 12/2004 | |
| JP | 2008-151641 | | 7/2008 | |
| JP | 2008-183797 | | 8/2008 | |
| JP | 2017-83300 | | 5/2017 | |
| WO | 2019/209180 | | 10/2019 | |
| WO | WO-2019241849 A1 | * | 12/2019 | |
| WO | 2020/027727 | | 2/2020 | |

OTHER PUBLICATIONS

Written Opinion issued Apr. 19, 2022 in corresponding International (PCT) Patent Application No. PCT/JP2022/005150, with English language translation.
Office Action issued Apr. 15, 2025 in United Kingdom Patent Application No. 2311964.7.

* cited by examiner

JOINT PORTION EVALUATING METHOD AND JOINT PORTION EVALUATING DEVICE

FIELD

The present disclosure relates to a joint portion evaluating method for evaluating a joint portion and a joint portion evaluating device.

BACKGROUND

As a conventional joint portion evaluating method for evaluating a joint portion, there has been known a joint portion evaluating method for evaluating a joint state of a joint portion by nondestructively inspecting a weak bond (for example, see Japanese Patent Application Laid-open No. 2017-83300). In this joint portion evaluating method, an alternating current signal is applied to the joint portion, and, while the frequency of the alternating current signal is changed, a measurement is performed to obtain a current value and a voltage value, and, from the obtained current value and voltage value, an evaluation value on predetermined electrical characteristics is derived.

However, in the joint portion evaluating method described in Japanese Patent Application Laid-open No. 2017-83300, the frequency of the applied alternating current signal is high, which causes a large error factor resulting from a difference in the form of the joint portion. For example, even with a several tens of micrometer difference in the thickness of the joint portion or a millimeter change in the form of the joint portion as a form error, detecting an appropriate evaluation value becomes difficult due to an adverse effect of a signal-to-noise ratio (S/N).

Therefore, an object of the present disclosure is to provide a joint portion evaluating method and a joint portion evaluating device that are capable of suitably evaluating a joint portion even when a difference in the form of the joint portion arises.

SUMMARY OF THE INVENTION

A joint portion evaluating method according to the present disclosure is for measuring and evaluating a joint state of a joint portion at which a first joint body and a second joint body are joined together. The joint portion evaluating method includes the steps of: acquiring as a reference value a capacitance value of the joint portion in a reference measurement state serving as a reference for measurement conditions; changing a measurement state from the reference measurement state, and acquiring as a measured value a capacitance value of the joint portion in a changed measurement state arising after the changing of the measurement state; deriving as a measurement evaluation value a value obtained by referencing the measured value with the reference value; and performing an evaluation based on the measurement evaluation value derived.

A joint portion evaluating device according to the present disclosure measures and evaluates a joint state of a joint portion at which a first joint body and a second joint body are joined together. The joint portion evaluating device includes: a pair of electrodes disposed to form a capacitor at the joint portion; and a control unit that measures a capacitance value of the joint portion and evaluates the joint portion based on the capacitance value measured, wherein the control unit performs the steps of: acquiring as a reference value a capacitance value of the joint portion in a reference measurement state serving as a reference for measurement conditions; changing a measurement state from the reference measurement state, and acquiring as a measured value a capacitance value of the joint portion in the changed measurement state arising after the changing of the measurement state; deriving as a measurement evaluation value a value obtained by referencing the measured value with the reference value; and performing an evaluation based on the measurement evaluation value derived.

According to the present disclosure, a joint portion can be suitably evaluated even when a difference in the form of the joint portion arises.

DETAILED DESCRIPTION OF THE INVENTION

Hereinafter, embodiments according to the present disclosure will be described in detail with reference to the drawings. Note that the present invention is not limited by the embodiments. Constituents described in the following embodiments include constituents that are substitutable or easily realizable by those skilled in the art or constituents that are substantially the same as those described in the embodiments. Furthermore, the constituents described below can be used in combination as appropriate, and when a plurality of embodiments are presented, the embodiments can be used in combination.

First Embodiment

Figure 1:
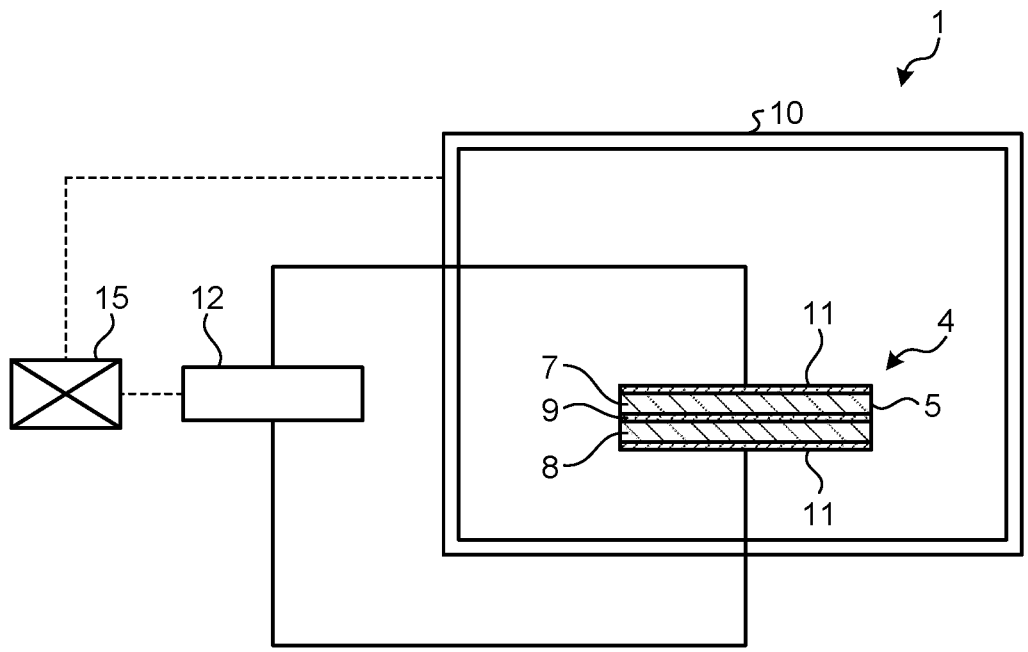
FIG. 1 is a schematic diagram of a joint portion evaluating device according to a first embodiment.
Figure 2:
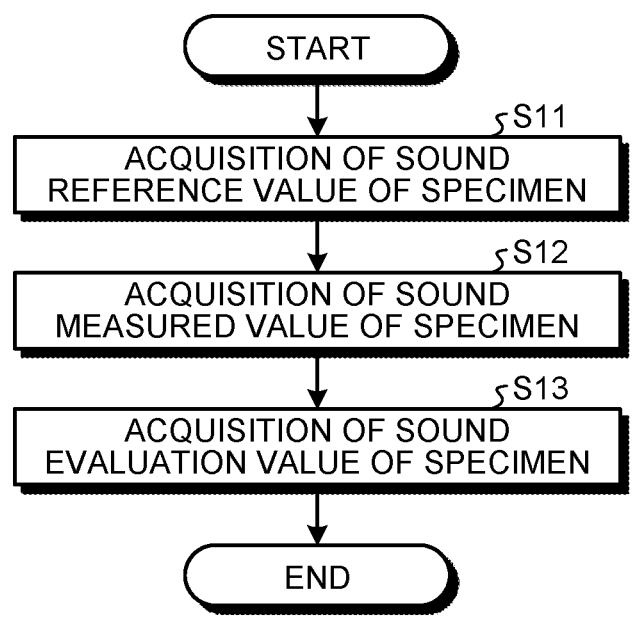
FIG. 2 is a flowchart illustrating an example of a joint portion evaluating method according to the first embodiment.
Figure 3:
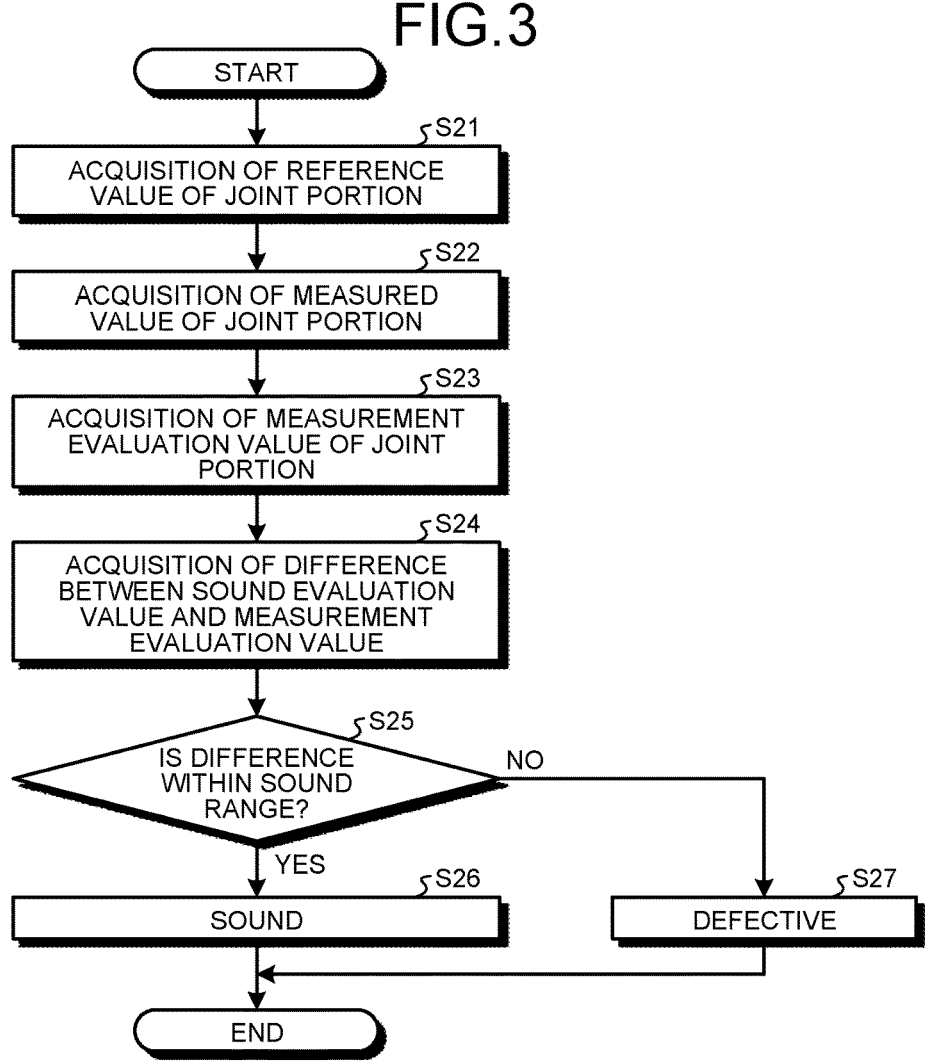
FIG. 3 is a flowchart illustrating an example of the joint portion evaluating method according to the first embodiment.
Figure 4:
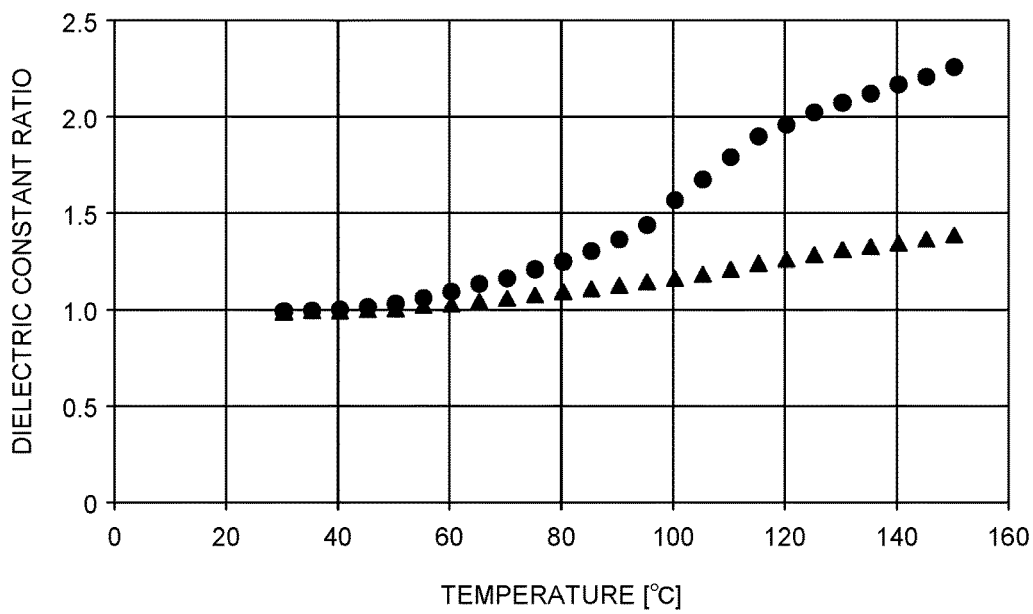
FIG. 4 is a graph of sound evaluation values and measurement evaluation values.

A joint portion evaluating method and a joint portion evaluating device 1 according to a first embodiment is a method and a device for measuring and evaluating a joint state of a joint portion 5. In the joint portion evaluating method, the joint state of the joint portion 5 immediately after joining is evaluated or the joint state of the joint portion 5 after aging is evaluated. FIG. 1 is a schematic diagram of the joint portion evaluating device 1 according to the first embodiment. FIG. 2 is a flowchart illustrating an example of the joint portion evaluating method according to the first embodiment. FIG. 3 is a flowchart illustrating an example of the joint portion evaluating method according to the first embodiment. FIG. 4 is a graph of sound evaluation values and measurement evaluation values. Prior to descriptions about the joint portion evaluating method and the joint portion evaluating device 1, the joint portion 5 will be described first.

Joint Portion

The joint portion 5 is a portion formed in a joined body 4 formed by joining a first joint body 7 and a second joint body 8, and also a portion at which the first joint body 7 and the second joint body 8 are joined together. Examples of the joint portion 5 include an adhesive-bonded portion formed by bonding with an adhesive 9 or a fusion-bonded portion formed by fusion-bonding. In the first embodiment, the adhesive-bonded portion is applied as the joint portion 5, but the fusion-bonded portion may be applied.

The first joint body 7 and the second joint body 8 are each a composite material and form a laminate of composite material layers including a carbon fiber and a resin. The laminating direction of the laminate is a direction in which the first joint body 7 and the second joint body 8 face each other. Although the first joint body 7 and the second joint body 8 are each the composite material including the carbon fiber, but are not limited thereto, and any reinforcing fiber may be used. In the first embodiment, both the first joint body 7 and the second joint body 8 are the composite materials, but may be metal materials or may be a combination of the composite material and a metal material.

In the first embodiment, in the case where the joint portion 5 is the adhesive-bonded portion, there is a possibility of the occurrence of a weak bond in which bonding strength decreases due to contamination of a joint surface, for example. Therefore, the joint portion evaluating method using the joint portion evaluating device 1 evaluates whether or not the joint state of the joint portion 5 is a weak bond. Even in the case where the joint portion 5 is the fusion-bonded portion, the joint portion evaluating method using the joint portion evaluating device 1 can evaluate the joint state in which joint strength at the joint portion 5 is decreased.

Joint Portion Evaluating Device

As illustrated in FIG. 1, the joint portion evaluating device 1 includes a heating furnace 10, a pair of electrodes 11, an alternating current power source 12, and a control unit 15.

The heating furnace 10 is capable of accommodating the joined body 4 therein and is configured to heat the joined body 4 to a predetermined temperature by heating the inside of the heating furnace 10 to the predetermined temperature. The heating furnace 10 is connected to the control unit 15, and the control unit 15 is configured to control a furnace temperature of the heating furnace 10 to the predetermined temperature.

The pair of the electrodes 11 is disposed to sandwich the joint portion 5 of the joined body 4 from both sides in the laminating direction (opposed direction), whereby a capacitor is formed. Hence, the joint portion 5 is disposed as a dielectric between the pair of the electrodes 11.

The alternating current power source 12 is configured to apply an alternating current signal between the pair of the electrodes 11. The alternating current signal is an alternating current or an alternating current voltage. Examples of the alternating current power source 12 include an LCR meter. The alternating current power source 12 is capable of changing the frequency of the alternating current signal and applying the alternating current signal between the pair of the electrodes 11. The alternating current power source 12 is connected to the control unit 15, and the control unit 15 is configured to control the applied alternating current signal so that the alternating current signal has a predetermined frequency. Note that the alternating current power source 12 may superimpose a direct current signal on the alternating current signal and apply the resulting signal between the pair of the electrodes 11. By superimposing the direct current signal, the alternating current power source 12 can reduce adverse effects of the signal-to-noise ratio (S/N), so that a capacitance value of the capacitor formed by the pair of the electrodes 11 can be measured with high accuracy.

The control unit 15 includes an integrated circuit such as a central processing unit (CPU). The control unit 15 is configured to perform joint portion evaluation processing for evaluating the joint state of the joint portion 5. In the joint portion evaluation processing, the control unit 15 controls the heating furnace 10 and the alternating current power source 12 to change the furnace temperature of the heating furnace 10 or the frequency of the alternating current signal.

Joint Portion Evaluating Method

Next, with reference to FIGS. 2 to 4, an example of the joint portion evaluating method performed using the joint portion evaluating device 1 will be described.

In the joint portion evaluating method, a sound evaluation value, which is an evaluation value of a specimen including a sound joint portion 5, is acquired in advance, and then, a measurement evaluation value, which is an evaluation value of the joint portion 5 of the joined body 4 as an evaluation target, is acquired, and the joint state of the joint portion 5 is evaluated, based on the sound evaluation value and the measurement evaluation value. Here, the sound joint portion 5 of the specimen and the joint portion 5 of the joined body 4 as a measurement target are identical in form.

With reference to FIG. 2, a processing flow of acquisition of the sound evaluation value will be explained. As illustrated in FIG. 2, in the joint portion evaluating method, first, the control unit 15 performs a step S11 to acquire a sound reference value, which is a reference value of the sound joint portion 5. Here, the reference value is a capacitance value of the joint portion 5 in a reference measurement state serving as a reference for measurement conditions. The reference measurement state includes a reference temperature serving as a reference for the joint portion 5, and the reference temperature is a room temperature. The room temperature is in a range from 1° C. to 35° C. The reference temperature is, for example, 30° C. The measurement frequency of an alternating current signal applied at the time of measuring the capacitance value is beneficially 100 Hz or higher and 100 MHz or lower. In the first embodiment, the measurement frequency is 100 Hz or higher and 100 kHz or lower, and the capacitance value is measured in a state in which the frequency is fixed at a predetermined frequency. In other words, at the step S11, the furnace temperature of the heating furnace 10 is the room temperature, and using this temperature as the reference temperature, the control unit 15 applies an alternating current signal having the predetermined frequency to the pair of the electrodes 11 to acquire a capacitance value of the joint portion 5 as the reference value.

Subsequently, in the joint portion evaluating method, the control unit 15 performs a step S12 to acquire a sound measured value as a measured value of the sound joint portion 5. Here, the measured value is a capacitance value of the joint portion 5 in a changed measurement state arising after a measurement state is changed from the reference measurement state. The changed measurement state is a changed temperature of the joint portion 5. The changed temperature is higher than the reference temperature. The changed temperature is, for example, 80° C. or higher. At the step S12, sound measured values are acquired at predetermined temperature intervals. The measurement frequency of the alternating current signal applied at the time of measuring the capacitance value is the same as that at the step S11. In other words, at the step S12, the furnace temperature of the heating furnace 10 reaches the changed temperature, and the control unit 15 applies an alternating current signal having the predetermined frequency to the pair of the electrodes 11 to acquire the capacitance value of the joint portion 5 as a measured value.

Subsequently, in the joint portion evaluating method, the control unit 15 performs a step S13 to derive as a sound evaluation value a value obtained by referencing the sound measured value with the sound reference value. The referencing is to nondimensionalize the sound measured value by the sound reference value. Here, a capacitance value C is expressed by the equation "$C=\varepsilon \times f(r)$", that is, the product of a dielectric constant $\varepsilon$ by a form factor $f(r)$. The form factor $f(r)$ is expressed by the equation "$f(r)=S/d$", in which, for example, when the pair of the electrodes 11 forms a parallel plate capacitor, a parallel plate area S is divided by a distance d between the parallel plates. Let $C_0$ be a sound reference value, robe a dielectric constant at the sound reference value, $\varepsilon_0$ be the sound measured value (sound capacitance value), and z be the dielectric constant at the sound measured value. The sound evaluation value, which is a value obtained by referencing ($C/C_0$) the sound measured value C with the sound reference value $C_0$, is expressed by "$C/C_0=\varepsilon/\varepsilon_0$" when the form factor $f(r)$ is canceled. In other words, at the step S13, "$\varepsilon/\varepsilon_0$ (dielectric constant ratio)" is derived as the sound evaluation value.

FIG. 4 is a graph of a dielectric constant ratio varying with temperature. In the graph, the horizontal axis shows temperature and the vertical axis shows the dielectric constant ratio. A black triangle mark in FIG. 4 indicates a sound evaluation value varying with temperature. By performing the processing flow for acquiring a sound evaluation value as illustrated in FIG. 2, the sound evaluation value is acquired by the control unit 15 as a value that is a dielectric constant ratio gradually increasing from 1 to approximately 1.4 when the temperature rises from 30° C. to 150° C.

Next, with reference to FIG. 3, a processing flow for acquiring a measurement evaluation value and evaluating the joint state of the joint portion 5 as a measurement target will be described. As illustrated in FIG. 3, in the joint portion evaluating method, first, the control unit 15 performs a step S21 to acquire a reference value of the joint portion 5 as a measurement target. A reference measurement state at the step S21 is the same as that at the step S11. In other words, at the step S21, the furnace temperature of the heating furnace 10 is equal to a room temperature, and using this temperature as a reference temperature, the control unit 15 applies an alternating current signal having the predetermined frequency to the pair of the electrodes 11 to acquire a capacitance value of the joint portion 5 as a reference value.

Subsequently, in the joint portion evaluating method, the control unit 15 performs a step S22 to acquire a measured value of the joint portion 5 as the measurement target. A changed measurement state at the step S22 is the same as that at the step S12. In other words, at the step S22, the furnace temperature of the heating furnace 10 is a changed temperature, and the control unit 15 applies an alternating current signal having the predetermined frequency to the pair of the electrodes 11 to acquire a capacitance value of the joint portion 5 as a measured value.

Subsequently, in the joint portion evaluating method, the control unit 15 performs a step S23, to derive as a measurement evaluation value a value obtained by referencing the measured value with the reference value. In other words, at the step S23, "$\varepsilon/\varepsilon_0$ (dielectric constant ratio)" is derived as the measurement evaluation value. A black dot mark in FIG. 4 indicates a measurement evaluation value varying with temperature. The measurement evaluation value in FIG. 4 is a value obtained when the joint state of the joint portion 5 is defective (weak bond). By performing the processing flow for acquiring a measurement evaluation value as illustrated in FIG. 3, the measurement evaluation value is acquired by the control unit 15 as a value that is a dielectric constant ratio increasing from 1 to approximately 2.3 when the temperature rises from 30° C. to 150° C.

Subsequently, in the joint portion evaluating method, the control unit 15 performs a step S24 for acquiring a difference between the acquired sound evaluation value and the measurement evaluation value. The control unit 15 performs a step S25 to determine whether or not the acquired difference is within a sound range. As the difference is larger, the integrity is lower. If the control unit 15 determines that the difference is within the sound range at the step S25 (Yes at the step S25), the control unit 15 rates the joint portion 5 sound (at a step S26) and terminates the processing flow for evaluating the joint state of the joint portion 5. In contrast, if the control unit 15 determines that the difference is not within the sound range at the step S25 (No at the step S25), the control unit 15 rates the joint portion 5 defective (weak bond) (at a step S27) and terminates the processing flow for evaluating the joint state of the joint portion 5.

Note that, in the joint portion evaluating method according to the first embodiment, as illustrated in the processing flow in FIG. 3, the integrity of the joint state of the joint portion 5 is evaluated, based on the difference between the sound evaluation value and the measurement evaluation value, but the joint portion evaluating method is not particularly limited by this processing flow. In the joint portion evaluating method, the joint portion 5 may be evaluated using only the measurement evaluation value.

With the slope of the measurement evaluation value taken into consideration, the joint portion 5 may be evaluated using the measurement evaluation value. For example, the integrity of the joint state of the joint portion 5 may be evaluated by comparing the slope of the sound evaluation value with the slope of the measurement evaluation value, or the integrity of the joint state of the joint portion 5 may be evaluated only from the slope of the measurement evaluation value.

In the first embodiment, the paired electrodes 11 are provided on both sides of the joint portion 5, but, the present invention is not limited by this configuration. A laminate of composite material layers including a carbon fiber and a resin may be applied as the first joint body 7 and the second joint body 8, in which a predetermined composite material layer of the first joint body 7 is used as one of the paired electrodes 11, meanwhile a predetermined composite material layer of the second joint body 8 may be used as the other one of the paired electrodes 11.

Second Embodiment

Next, a second embodiment will be described. In the second embodiment, to avoid duplicate descriptions, constituents that differ from those in the first embodiment will be described, meanwhile constituents that are the same as those in the first embodiment will be given the same reference signs for description.

In the joint portion evaluating method according to the first embodiment, the reference temperature is used as the reference measurement state, and the changed temperature is used as the changed measurement state. In the joint portion evaluating method according to the second embodiment, instead of the reference temperature in the first embodiment, a reference measurement frequency is used as the reference measurement state, and, instead of the changed temperature in the first embodiment, a changed frequency is used as the changed measurement state. Note that, in the second embodiment, the furnace temperature of the heating furnace 10 is fixed at a predetermined temperature.

Specifically, in the joint portion evaluating method according to the second embodiment, when the sound reference value and the reference value are acquired at the step S11 and the step S21, respectively, the frequency of the alternating current signal applied between the pair of the electrodes 11 by the alternating current power source 12 is the reference measurement frequency. The control unit 15 then applies the alternating current signal having the reference measurement frequency to the pair of the electrodes 11 to acquire the capacitance values of the joint portion 5 as the sound reference value and the reference value.

In the joint portion evaluating method, when the sound measured value and the measured value are acquired at the step S12 and the step S22, respectively, the frequency of the alternating current signal applied between the pair of the electrodes 11 by the alternating current power source 12 is the changed frequency, which is higher than the reference measurement frequency. The control unit 15 then applies the alternating current signal having the changed frequency to the pair of the electrodes 11 to acquire the capacitance values of the joint portion 5 as the sound measured value and the measured value. Here, the reference measurement frequency is 1 kHz or higher and 100 kHz or lower, and the changed frequency is 10 MHz or higher and 100 MHz or lower.

Then, in the joint portion evaluating method, at the step S13 and the step S23, values obtained by referencing the sound measured value and the measured value with the sound reference value and the reference value, respectively, are derived as the sound evaluation value and the measurement evaluation value.

Third Embodiment

Next, a third embodiment will be described. In the third embodiment, to avoid duplicate descriptions, constituents that differ from those in the first and second embodiments will be described, meanwhile constituents that are the same as those in the first and second embodiments will be given the same reference signs for description.

In the joint portion evaluating method according to the first embodiment, the reference temperature is used as the reference measurement state, and the changed temperature is used as the changed measurement state. In the joint portion evaluating method according to the third embodiment, the reference temperature and the reference measurement frequency are used as the reference measurement state, and the changed temperature and the changed frequency are used as the changed measurement state. Furthermore, in the third embodiment, the joint portion 5 is evaluated using a measurement evaluation value based on the reference temperature and a measurement evaluation value based on the reference measurement frequency.

In other words, in the joint portion evaluating method according to the third embodiment, a reference value based on the reference temperature and a reference value based on the reference measurement frequency are acquired at the step S21. Subsequently, in the joint portion evaluating method, a measured value based on the reference temperature and a measured value based on the reference measurement frequency are acquired at the step S22. Then, in the joint portion evaluating method, a measurement evaluation value based on the reference temperature is acquired from the reference value and the measured value based on the reference temperature, and a measurement evaluation value based on the reference measurement frequency is acquired from the reference value and the measured value based on the reference measurement frequency at the step S23.

Subsequently, in the joint portion evaluating method according to the third embodiment, a correlation between the measurement evaluation value based on the reference temperature and the measurement evaluation value based on the reference measurement frequency is acquired, and an evaluation based on the correlation is performed. Examples of the evaluation based on the correlation can include an evaluation of the joint state of the joint portion 5 as the measurement target, the evaluation being performed by beforehand acquiring a correlation on a specimen including a sound joint portion 5 and then comparing the correlation on the sound joint portion 5 with a correlation on a joint portion 5 as a measurement target.

Note that, in the third embodiment, in the case of evaluating the joint portion 5, the sound evaluation value based on the reference temperature and the sound evaluation value based on the reference measurement frequency may be acquired, and the difference between these sound evaluation values may be determined, and then the joint state of the joint portion 5 may be evaluated, based on the difference, as in the cases of the first and second embodiments.

As described above, the joint portion evaluating method and the joint portion evaluating device 1 described in the embodiments will be understood, for example, as follows.

A joint portion evaluating method according to a first aspect is a method for measuring and evaluating the joint state of the joint portion 5 at which the first joint body 7 and the second joint body 8 are joined together, the method comprising: the step S21 of acquiring as a reference value a capacitance value of the joint portion 5 in a reference measurement state serving as a reference for measurement conditions; the step S22 of changing a measurement state from the reference measurement state and acquiring, as a measured value, the capacitance value of the joint portion 5 in a changed measurement state arising after the change of the state; the step S23 of deriving as a measurement evaluation value a value obtained by referencing the measured value with the reference value; and the steps S24 to S27 of performing an evaluation based on the derived measurement evaluation value.

With this configuration, by referencing the measured value with the reference value, the measurement evaluation value in which an effect of the form of the joint portion 5 is canceled can be acquired. Therefore, even when a difference in the form of the joint portion 5 arises, the joint portion 5 can be suitably evaluated using the measurement evaluation value.

In a second aspect, the joint portion 5 is an adhesive-bonded portion at which the first joint body 7 and the second joint body 8 are bonded together via an adhesive.

With this configuration, the adhesive-bonded portion can be suitably evaluated using the measurement evaluation value.

In a third aspect, the joint portion 5 is a fusion-bonded portion at which the first joint body 7 and the second joint body 8 are fusion-bonded together.

With this configuration, the fusion-bonded portion can be suitably evaluated using the measurement evaluation value.

In a fourth aspect, the reference measurement state includes a reference temperature as a reference for the joint portion 5, and, at the step S22 of acquiring the measured value, the temperature of the joint portion 5 is changed from the reference temperature, and the capacitance value of the joint portion 5 at the changed temperature as the changed measurement state arising after the change of the temperature is acquired as the measured value.

With this configuration, the measurement evaluation value that varies with temperature is acquired, and, by using the measurement evaluation value, the joint state of the joint portion 5 can be evaluated in consideration of temperature dependence.

In a fifth aspect, the reference temperature is a room temperature.

With this configuration, when the room temperature is used as the reference temperature, an operation for the measurement of the capacitance value can be simplified.

In a sixth aspect, the changed temperature is higher than the reference temperature.

With this configuration, a change in the measurement evaluation value that is associated with a change in temperature can be suitably acquired.

In a seventh aspect, the capacitance value of the joint portion is acquired by applying an alternating current signal having a predetermined measurement frequency, and the measurement frequency is 100 Hz or higher and 100 MHz or lower.

With this configuration, in the case of changing the temperature of the joint portion when the measurement frequency is, for example, 100 Hz or higher and 100 kHz or lower, a device configuration configured in accordance with the bandwidth of the measurement frequency can be simplified and thus the cost of the device can be reduced.

In an eighth aspect, the reference measurement state includes a reference measurement frequency as a reference for an alternating current signal to be applied for acquiring the capacitance value of the joint portion 5, and, at the step S22 of acquiring the measured value, the frequency is changed from the reference measurement frequency, and the capacitance value of the joint portion 5 at the changed frequency as the changed measurement state arising after the change in frequency is acquired as the measured value.

With this configuration, the measurement evaluation value that varies with frequency is acquired, and, by using the measurement evaluation value, the joint state of the joint portion 5 can be evaluated in consideration of frequency dependence.

In a ninth aspect, the reference measurement frequency is 1 kHz or higher and 100 kHz or lower, and the changed frequency is 10 MHz or higher and 100 MHz or lower.

With this configuration, a change in the measurement evaluation value that is associated with a change in frequency can be suitably acquired.

In a tenth aspect, at the step S22 of acquiring the measured value, when the measurement evaluation value based on the reference temperature and the measurement evaluation value based on the reference measurement frequency are acquired, at the step of performing the evaluation, a correlation between the measurement evaluation value based on the reference temperature and the measurement evaluation value based on the reference measurement frequency is acquired, and an evaluation based on the correlation is performed.

With this configuration, the joint state of the joint portion 5 can be evaluated from the correlation between the measurement evaluation value based on the reference temperature and the measurement evaluation value based on the reference measurement frequency.

In an eleventh aspect, the joint portion evaluating method further includes: the step S11 of acquiring a sound reference value that is the reference value of the sound joint portion 5; the step S12 of acquiring a sound measured value that is the measured value of the sound joint portion 5; and the step S13 of deriving as a sound evaluation value a value obtained by referencing the sound measured value with the sound reference value, in which, at the steps S24 to S27 of performing an evaluation, the evaluation based on the difference between the sound evaluation value and the measurement evaluation value is performed.

With this configuration, the integrity of the joint portion 5 can be evaluated from the difference between the sound evaluation value and the measurement evaluation value, and thus, the joint portion 5 can be evaluated with high accuracy.

In a twelfth aspect, at the steps S24 to S27 of performing an evaluation, when the difference between the sound evaluation value and the measurement evaluation value is within a predetermined sound range, the joint portion 5 is rated sound.

With this configuration, the integrity of the joint portion 5 can be easily evaluated.

The joint portion evaluating device 1 according to a thirteenth aspect is configured to measure and evaluate the joint state of the joint portion 5 at which the first joint body 7 and the second joint body 8 are joined together, the joint portion evaluating device 1 including: the pair of the electrodes 11 disposed to form a capacitor at the joint portion 5; and the control unit 15 configured to measure a capacitance value of the joint portion 5 and evaluate the joint portion 5, based on the measured capacitance value, in which the control unit 15 performs: the step S21 of acquiring as a reference value a capacitance value of the joint portion 5 in a reference measurement state serving as a reference for measurement conditions; the step S22 of changing a measurement state from the reference measurement state and acquiring as a measured value a capacitance value of the joint portion 5 in a changed measurement state arising after the change of the measurement state; the step S23 of deriving as a measurement evaluation value a value obtained by referencing the measured value with the reference value; and the steps S24 to S27 of performing an evaluation based on the derived measurement evaluation value.

With this configuration, by referencing the measured value with the reference value, the measurement evaluation value in which an effect of the form of the joint portion 5 is canceled can be acquired. Therefore, even when a difference in the form of the joint portion 5 arises, the joint portion 5 can be suitably evaluated using the measurement evaluation value.

In a fourteenth aspect, the first joint body 7 and the second joint body 8 form a laminate of composite material layers including a carbon fiber and a resin, and the pair of the electrodes 11 includes a predetermined composite material layer of the first joint body 7 disposed on one side of the joint portion 5 and a predetermined composite material layer of the second joint body 8 disposed on another side of the joint portion 5.

With this configuration, the predetermined composite material layers at the joint portion 5 can be made use of as the pair of the electrodes 11, which results in a simpler device configuration.

In a fifteenth aspect, the joint portion evaluating device 1 further includes the alternating current power source 12 configured to apply an alternating current signal to the pair of the electrodes 11, in which the alternating current power source 12 superimposes a direct current signal on the alternating current signal to acquire a capacitance value of the joint portion 5.

With this configuration, the direct current signal is superimposed to reduce an adverse effect of the signal-to-noise ratio (S/N), and thus the capacitance value can be measured with high accuracy.

REFERENCE SIGNS LIST

1 Joint portion evaluating device
4 Joined body
5 Joint portion
7 First joint body
8 Second joint body
9 Adhesive
10 Heating furnace
11 Pair of electrodes
12 Alternating current power source
15 Control unit

The invention claimed is:

1. A joint portion evaluating method for measuring and evaluating a joint state of a joint portion at which a first joint body and a second joint body are joined together, the joint portion evaluating method comprising:
acquiring as a reference value a capacitance value of the joint portion in a reference measurement state serving as a reference for measurement conditions;
changing a measurement state from the reference measurement state, and acquiring as a measured value a capacitance value of the joint portion in a changed measurement state arising after the changing of the measurement state;
deriving as a measurement evaluation value a value obtained by referencing the measured value with the reference value; and
performing an evaluation based on the measurement evaluation value derived,
wherein the reference measurement state includes a reference temperature serving as a reference at the joint portion, and
wherein the acquiring of the measured value includes changing a temperature of the joint portion from the reference temperature, and acquiring as the measured value a capacitance value of the joint portion at a changed temperature serving as the changed measurement state arising after the change of the temperature.

2. The joint portion evaluating method according to claim 1, wherein the joint portion is an adhesive-bonded portion at which the first joint body and the second joint body are bonded together via an adhesive.

3. The joint portion evaluating method according to claim 1, wherein the joint portion is a fusion-bonded portion at which the first joint body and the second joint body are fusion-bonded together.

4. The joint portion evaluating method according to claim 1, wherein the reference temperature is a room temperature.

5. The joint portion evaluating method according to claim 1, wherein the changed temperature is higher than the reference temperature.

6. The joint portion evaluating method according to claim 1, wherein:
the capacitance value of the joint portion is acquired by applying an alternating current signal having a predetermined measurement frequency, and
the measurement frequency is 100 Hz or higher and 100 MHz or lower.

7. The joint portion evaluating method according to claim 1, wherein:
the reference measurement state includes a reference measurement frequency serving as a reference for the alternating current signal to be applied when the capacitance value of the joint portion in a reference measurement state is acquired, and
the acquiring of the measured value includes changing a frequency from the reference measurement frequency, and acquiring as the measured value the capacitance value of the joint portion at a changed frequency serving as the changed measurement state arising after the changing of the frequency.

8. The joint portion evaluating method according to claim 7, wherein:
the reference measurement frequency is 1 kHz or higher and 100 kHz or lower, and
the changed frequency is 10 MHz or higher and 100 MHz or lower.

9. The joint portion evaluating method according to claim 7, wherein, when the measurement evaluation value based on the reference temperature serving as a reference for the joint portion and the measurement evaluation value based on the reference measurement frequency are acquired in the acquiring of the measured value, the performing of the evaluation includes acquiring a correlation between the measurement evaluation value based on the reference temperature and the measurement evaluation value based on the reference measurement frequency, and performing an evaluation based on the correlation.

10. The joint portion evaluating method according to claim 1, further comprising:
acquiring a sound reference value as the reference value of the joint portion being sound;
acquiring a sound measured value as the measured value of the joint portion being sound; and
deriving as a sound evaluation value a value obtained by referencing the sound measured value with the sound reference value,
wherein the performing of the evaluation includes performing the evaluation based on a difference between the sound evaluation value and the measurement evaluation value.

11. The joint portion evaluating method according to claim 10, wherein the performing of the evaluation includes, when the difference between the sound evaluation value and the measurement evaluation value is within a predetermined sound range, rating the joint portion sound.

12. A joint portion evaluating device that measures and evaluates a joint state of a joint portion at which a first joint body and a second joint body are joined together, the joint portion evaluating device comprising:
a pair of electrodes disposed to form a capacitor at the joint portion; and
a control unit that measures a capacitance value of the joint portion and evaluates the joint portion based on the capacitance value measured, wherein
the control unit performs:
acquiring as a reference value a capacitance value of the joint portion in a reference measurement state serving as a reference for measurement conditions;
changing a measurement state from the reference measurement state, and acquiring as a measured value a capacitance value of the joint portion in the changed measurement state arising after the changing of the measurement state;
deriving as a measurement evaluation value a value obtained by referencing the measured value with the reference value; and
performing an evaluation based on the measurement evaluation value derived,
wherein the reference measurement state includes a reference temperature serving as a reference at the joint portion, and wherein the acquiring of the measured value includes changing a temperature of the joint portion from the reference temperature, and acquiring as the measured value a capacitance value of the joint portion at a changed temperature serving as the changed measurement state arising after the change of the temperature.

13. The joint portion evaluating device according to claim 12, wherein:
the first joint body and the second joint body form a laminate of composite material layers including a carbon fiber and a resin,
the pair of electrodes includes a predetermined composite material layer of the first joint body on one side of the joint portion and a predetermined composite material layer of the second joint body on another side of the joint portion.

14. The joint portion evaluating device according to claim 12, further comprising:
an alternating current power source that applies an alternating current signal to the pair of electrodes, wherein the alternating current power source superimposes a direct current signal on the alternating current signal to acquire a capacitance value of the joint portion.

15. A joint portion evaluating method for measuring and evaluating a joint state of a joint portion at which a first joint body and a second joint body are joined together, the joint portion evaluating method comprising:

acquiring as a reference value a capacitance value of the joint portion in a reference measurement state serving as a reference for measurement conditions;
changing a measurement state from the reference measurement state, and acquiring as a measured value a capacitance value of the joint portion in a changed measurement state arising after the changing of the measurement state;
deriving as a measurement evaluation value a value obtained by referencing the measured value with the reference value; and
performing an evaluation based on the measurement evaluation value derived,
wherein the reference measurement state includes a reference measurement frequency serving as a reference for an alternating current signal to be applied when the capacitance value of the joint portion in a reference measurement state is acquired, and
wherein the acquiring of the measured value includes changing a frequency from the reference measurement frequency, and acquiring as the measured value the capacitance value of the joint portion at a changed frequency serving as the changed measurement state arising after the changing of the frequency.

* * * * *